United States Patent
Bienert

[11] Patent Number: 5,104,178
[45] Date of Patent: Apr. 14, 1992

[54] FRAME FOR A VEHICLE SLIDING ROOF OR A SLIDING LIFTING ROOF AND METHOD FOR FORMING SAME

[75] Inventor: Horst Bienert, Gauting, Fed. Rep. of Germany

[73] Assignee: Webasto AG Fahrzeugtechnik, Stockdorf, Fed. Rep. of Germany

[21] Appl. No.: 692,247

[22] Filed: Apr. 26, 1991

[30] Foreign Application Priority Data

May 7, 1990 [DE] Fed. Rep. of Germany ....... 4014487

[51] Int. Cl.⁵ ............................................... B60J 7/00
[52] U.S. Cl. .................................... 296/216; 296/213; 296/223; 74/502.4
[58] Field of Search ....................... 296/213, 216, 223; 74/502.4

[56] References Cited

U.S. PATENT DOCUMENTS

| | | | |
|---|---|---|---|
| 3,263,979 | 8/1966 | Conrad | 74/502.4 X |
| 3,964,337 | 6/1976 | Pardington | 74/502.4 |
| 4,237,656 | 12/1980 | Hess et al. | 74/502.4 X |
| 4,749,227 | 6/1988 | Bienert et al. | 296/221 |
| 4,911,497 | 3/1990 | Schreiter et al. | 296/222 |
| 4,969,681 | 11/1990 | Schleicher et al. | 296/223 |
| 4,995,665 | 2/1991 | Ichinose et al. | 296/213 |

FOREIGN PATENT DOCUMENTS

| | | | |
|---|---|---|---|
| 2836801 | 3/1980 | Fed. Rep. of Germany | 296/223 |
| 3419901 | 11/1986 | Fed. Rep. of Germany | |
| 3525320 | 1/1987 | Fed. Rep. of Germany | 296/216 |

Primary Examiner—Dennis H. Pedder
Attorney, Agent, or Firm—Sixbey, Friedman, Leedom & Ferguson

[57] ABSTRACT

A frame for a vehicle roof of the type having a roof opening in a fixed vehicle roof surface and a cover for closing the roof opening and a device for displacing the cover to a position at least partially opening the roof opening by at least one of sliding and lifting motions, has two lateral side parts which are made of metal and extend in transversely spaced apart relationship to each other, parallel to a longitudinal axis of the vehicle, an injection molded synthetic plastic front part to which corner parts, serving as transition areas to the lateral side parts are directly molded, and at least one cross member interconnecting said lateral side parts. The lateral side parts have guides for cover guide members which support the cover for displacement therealong and which cooperate with a drive unit at the front part via pressure-resistant drive cables. Guide tubes for the pressure-resistant drive cables are at least partially embedded into the molded material of the front part. The construction of the frame facilitates a building block method of assembly, especially when the side parts are formed of continuous light metal extrusion profiles that can be trimmed to length.

20 Claims, 4 Drawing Sheets

FRAME FOR A VEHICLE SLIDING ROOF OR A SLIDING LIFTING ROOF AND METHOD FOR FORMING SAME

BACKGROUND OF THE INVENTION

The invention relates to a frame for a vehicle sliding roof or a sliding and lifting roof which is provided in a roof opening of a fixed roof surface. More particularly, the invention relates to such a frame which has two transversely spaced metal side parts extending parallel to the longitudinal axis of the vehicle, a front part, and at least one cross member; wherein the side parts guide pressure resistant drive cables which move guide members for a cover along the side parts and cooperate with a drive unit at the front; and the front part has corner areas as a transition to the side parts.

German Offenlegungsschrift 28 36 801 discloses a process for the assembly of an adjustable steel roof which provides that, prior to installation into the vehicle, the upper and lower parts of a front cable guide are connected into one unit, whereby pressure-resistant drive cables travel in a cable guide cooperating with a drive unit, by way of a crank at the front part of the unit. Subsequently, the lateral guide rails are connected with this unit via the drive cables. Such a procedure is intended for a sliding roof or a sliding and lifting roof where a preassembled unit is formed which can be incorporated into the vehicle at the appropriate time; for instance, at the assembly line. The frame described here is a multi-component frame consisting of steel parts, comprising a front part, two side parts arranged at a distance from each other, and two cross members connecting the side parts. The upper and lower parts in the area of the front part define a cable guide channel in which the pressure-resistant drive cables travel. Furthermore, the front part comprises corner areas which serve as a transition to the longitudinal parts and are connected with them by welding, or the like. The cable guides are disposed inside the roof opening, so that the dimensions of the opening area of this sliding roof or sliding and lifting roof are reduced by the multi-component frame. Also, the parts of the multi-component frame are made of metal so that the frame, weightwise, is heavy with a relatively tall height, which leads to diminished head room when it is mounted into a vehicle. Additionally, a spring clamp is provided in the front part for reducing the wear on the moving pressure-resistant drive cables. Still further, separate water-conducting panels are disposed at the frame parts. Installation of such a multi-component frame is both time consuming and cost intensive.

German Offenlegungsschrift 34 19 901 discloses an assembly for sliding roofs, particularly for top-mounted roofs, which is constituted by a frame which can be attached to a fixed roof surface and has a multi-component design. The longitudinal parts thereof form guide rail parts made of light metal extruded profile material. The other parts of this multi-component frame-like assembly are sheet metal parts.

German Offenlegungsschrift 35 25 320 discloses a sliding roof module for motor vehicles, designed in a flat manner, consisting of a completely preassembled unit. The longitudinal parts of the module which serve as guide channels are formed as cut outs in a continuous profile material and are connected by way of transversely extending sheet metal formed parts. The guide channels or the longitudinal parts, respectively, are connected with at least one of the sheet metal formed parts by way of a plug and joint connection, or are connected by adhesive. This joint or adhesive connection is additionally secured by spot welding, riveting, screws, or flanged portions, for example. The sliding roof module can be adapted to various roof sizes of vehicles rather cost-effectively, whereby the profile material of the guide channels, preferably, is a light metal extruded profile material.

However, the designs mentioned above essentially present the same difficulties as those discussed in connection with German Offenlegungsschrift 28 36 801.

Finally, U.S. Pat. No. 4,749,227 shows a frame assembly for a vehicle roof in which the frame is of a one-component design and is made of synthetic material. The synthetic material used is a compressed molded plate (SMC—sheet molded compound) which is brought into the desired form by compression molding.

SUMMARY OF THE INVENTION

In contrast to the above designs, it is a primary objective of the present invention to provide a frame for a vehicle sliding roof or a vehicle sliding and lifting roof which can be manufactured cost-effectively, and which permits a space-saving and time-efficient installation into a vehicle.

To achieve these objectives, a frame, in accordance with the invention, has a front part formed of an injection molded part of synthetic plastic material to which corner areas, serving as a transition to the side parts, are directly molded, and in which guide tubes for guidance of the pressure-resistant cables are at least partially embedded.

In the multi-component frame of the invention, the front part is injection molded of synthetic material so that, for the purpose of guiding the pressure-resistant cables, guide tubes can be embedded into the injection mass of the front part, for example, by the injection molding. Such a design permits the front part to be much lighter in weight than is possible in the present state of the art, whereby the materials preferably employed for the synthetic injection molding part are thermoplastic polyester or glass-mat reinforced thermoplastic material. Another benefit derived with the inventive design is that the front part can be designed in a flat manner so that, in the installed state of the inventive frame, a greater amount of head room is obtained in the passenger compartment. To this end, preassembly and assembly of the frame upon installation into the vehicle roof are greatly facilitated. This frame can be used for a sliding roof as well as for a sliding and lifting roof in which the cover can be upwardly extended, at least at one end, for ventilating purposes.

Preferably, the guide tubes, which appropriately are made of a zinc alloy, and in which the pressure-resistant drive cables are guided at the front part, extend outside the opening defined by the frame, permitting the roof opening, defined by the frame, to have larger dimensions.

For the purpose of connecting the guide tubes with the front part, it has proven sufficient to merely embed the tubes in injected material at several spaced points in the front part, and particularly, to inject these guide tubes at that point in the front part where the pressure-resistant cables in the guide tubes cooperate with the drive unit, which drive unit can be powered by an electric motor, mechanical means or by way of a crank, for instance. Correspondingly, in the frame according to the invention, the guide tubes do not need to be completely surrounded by the synthetic molded part, rather the front part merely serves as a mounting therefor. The result is a saving of both, material and weight.

Preferably, in the frame in accordance with the invention, the configuration is such that the ends of the guide tubes, which are held at the front part, project above the corner areas thereof and are insertable into the cable guides in the side parts. Thus, during assembly, these projecting ends of the cable guide tubes can be inserted into the side parts of the frame, resulting in a connection of the front and side parts which has the necessary distortion resistance and dimensional stability. Accordingly, these projecting guide tube ends serve as aids in the assembly and alignment of the frame's longitudinal parts, as well as its front part.

In accordance with another aspect of the frame, water gutters are integrated into the front part and also into the side parts, and integrally formed water drainage tubes are provided at the corner areas of the front part. Therefore, the frame designed in accordance with the invention does not require parts to be assembled separately or additionally for the purpose of water drainage in the area of the frame's front part. Instead, these parts are given direct consideration during the manufacture, where they are formed by the injection process.

In accordance with still another feature of the preferred embodiment, the mounting for the drive unit is molded at the front part, so that the drive unit, like, for instance, an electric motor or the like, can be directly installed at the front part.

Furthermore, with a view to simplify the design of the inventive frame, only a single cross member is provided, which cross member is arranged approximately in the center of the side parts and is connected with them for the purpose of stiffening.

In accordance with the preferred embodiment, water collector end pieces, defining the water conducting area of the side parts, are secured at the rear ends of the side parts. These water collector end pieces, preferably, are of synthetic plastic material, and particularly, are an injection molded material resulting in further weight reduction of the frame parts, and the elimination of a need for additional water drainage devices at the side parts that would have to be attached in a separate manufacturing step. The manufacture of a waterproof connection of the water drains with the side parts is very labor-intensive and incurs high assembly costs. To this end, it is preferable that a water drain be directly molded to the respective water collector end pieces.

In accordance with another feature of the preferred embodiment of the frame, the water collector end pieces also have formed thereto a mounting means by which they, and the frame parts connected to them, can be attached at a fixed vehicle roof surface. Thus, the water collector end pieces have a dual role, as they also function as a mounting means for connection of the frame with the fixed roof surface.

In the frame, in accordance with the invention, the connections of the respective individual components are designed as a lap joint which can be connected by adhesion and, additionally, can be riveted. Such lap joint connections can be aligned relatively easily during the assembly and more particularly, can be made waterproof without substantial extra expense, eliminating the need for additional sealing measures at the water conducting areas of the individual components of the frame; a benefit which considerably simplifies both manufacture and assembly. The adhesion provides a preassembly step during the assembly process, prior to the final connection by means of the riveting of the lap joints.

Preferably, the single cross member is riveted with the longitudinal parts in a waterproof manner, whereby, a continuous material flow connection is provided in order to avoid leak points at the connection of the cross member with the longitudinal side parts.

In the frame, in accordance with the invention, the longitudinal parts, preferably, are made of a light metal, extrusion profile material, and more particularly, are made of an aluminum extrusion profile in the form of a stock material which can be cut to the respectively desired length of the longitudinal parts. The use of light metal extrusion profile material results in a weight reduction of the frame without the loss of required stiffness and stability.

In accordance with a preferred embodiment of the invention, the cross member, advantageously, is a sheet metal part made of the same light metal as the longitudinal parts, thereby ensuring a reliable waterproof connection of these parts. Furthermore, the cross member imparts to the entire assembly the necessary transverse stiffness, and the side parts along which the moving devices of the sliding roof or sliding and lifting roof cover are displaceable can be reliably aligned, parallel towards each other in order to achieve the best possible parallel guidance of the moving devices, with further consideration to the ease of actuating the sliding roof or sliding and lifting roof.

The frame described for a vehicle sliding roof or a vehicle sliding and lifting roof is designed such that its size is variable, and further is designed in the form of a building block system. The length of the frame dimensions is dependent upon the length of the frame's side parts, while the cross member determines the frame width.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
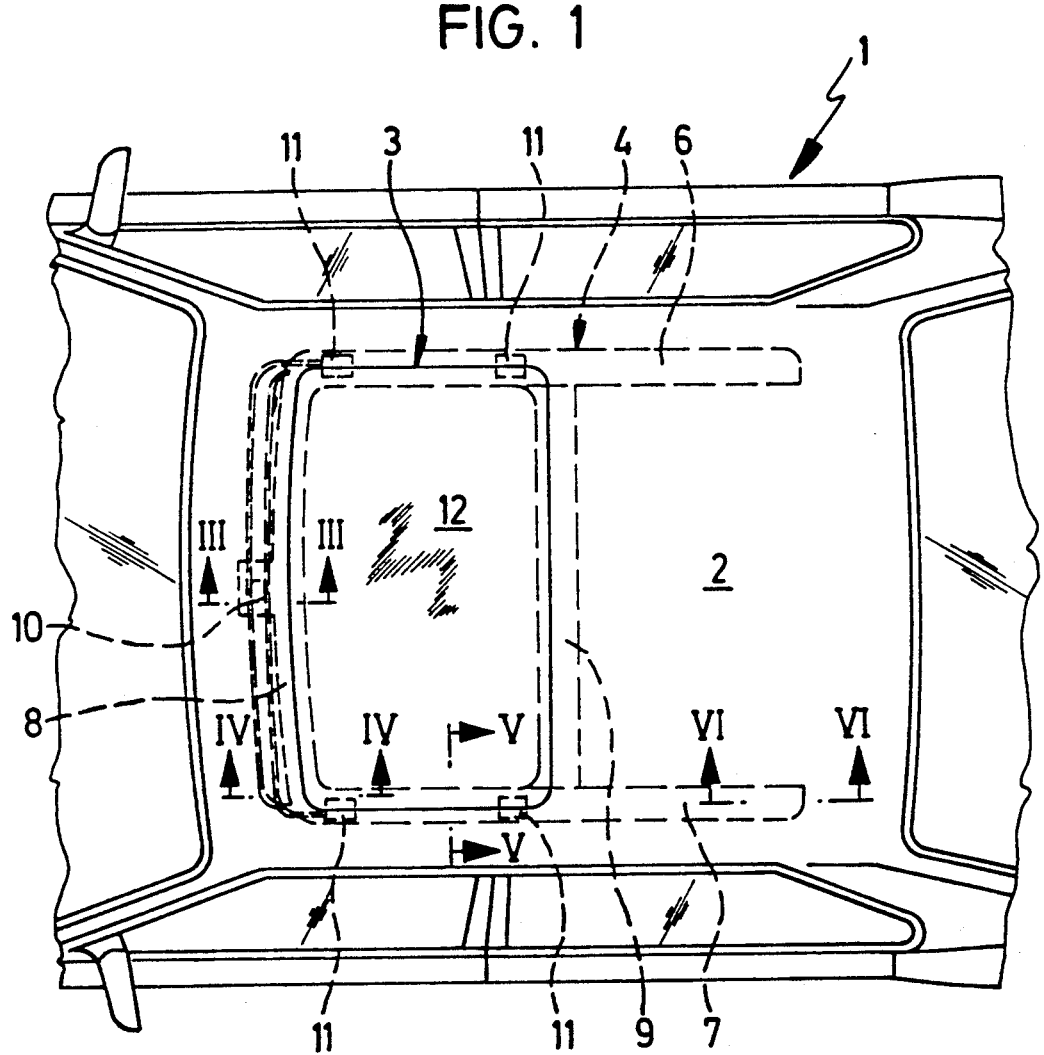
FIG. 1 is a schematic top view of a sliding roof or a sliding and lifting roof.

FIG. 1 shows a top view of a vehicle roof 1 which has a fixed roof surface 2 of vehicle roof 1 and a sliding roof or a sliding and lifting roof denoted by numeral 3. The sliding roof or sliding and lifting roof comprises a frame 4 which is inserted into a roof opening 5 (FIGS. 3 & 4) in fixed roof surface 2. Frame 4 comprises two lateral side parts 6 and 7, which are arranged parallel to the longitudinal axis of the vehicle, at a distance from each other, as well as a front part 8 and at least one cross member 9. At front part 8, there is provided a drive unit 10, such as an electric motor, having a pinion gear, or the like, for powering pressure-resistant drive cables (not shown in FIG. 1, 15 in FIG. 3), which are connected with guide members 11 and are guided at front part 8 and at side parts 6 and 7. By way of guide members 11, a cover 12 is displaceably guided at front part 8 and at side parts 6 and 7. By way of guide members 11, a cover 12 is displaceably guided along side parts 6 and 7 in the longitudinal direction of the vehicle from its illustrated closed position to a position in which it at least partially exposes roof opening 5, and/or cover 12 can be pivoted, preferably, at a rear end, such that it slantingly projects above the fixed roof surface 2 at the rear area, thereby creating a vent into the frame 4. The specific means by which such motions are obtainable are well known in the art and thus, need not be described here.

Figure 2:
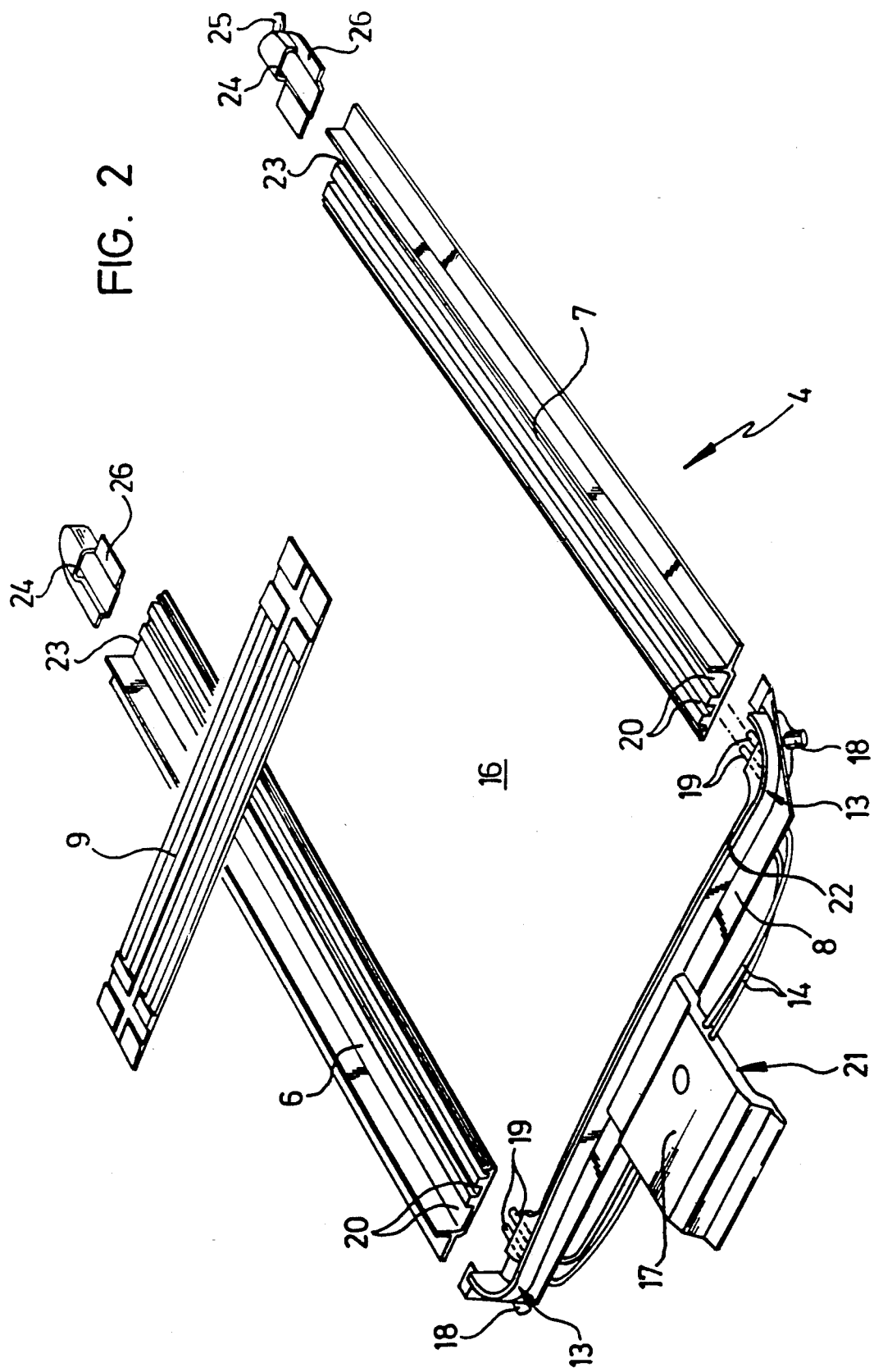
FIG. 2 is a perspective exploded view of a frame and frame parts.
Figure 3:
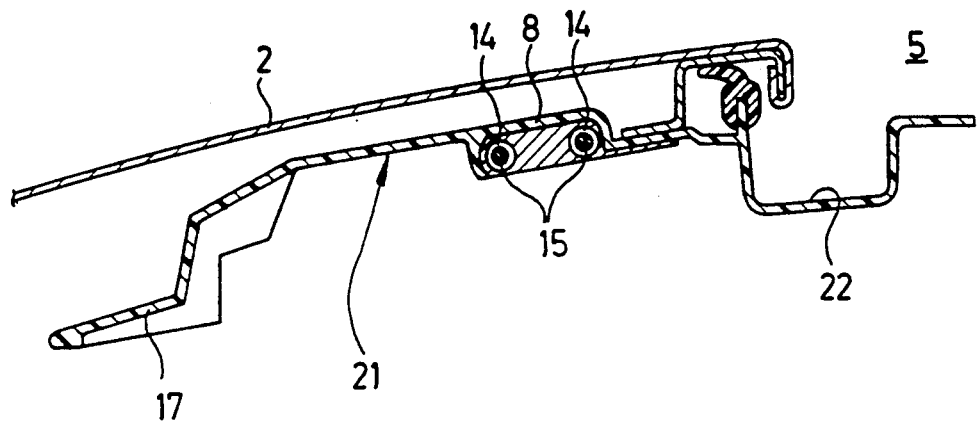
FIG. 3 is a sectional view taken along line III—III of FIG. 1.

A preferred embodiment of frame will now be described in greater detail with reference to FIGS. 2-6. In FIG. 2, frame 4 is depicted in an exploded view to clearly show the individual elements of which it is comprised. The two longitudinally extending, lateral side parts 6 and 7 are made of a light metal, continuous extruded profile, preferably, an aluminum extruded profile. Front part 8 of frame 4 is a molded part of synthetic plastic material to which the corner areas 13 are mold or formed as a part of, and which serves as a transition areas to the side parts 6 and 7. Front part 8 of frame 4, via corner areas 13, extends into the lateral side parts 6 and 7, respectively. Guide tubes 14 are provided which are at least partially embedded in front part 8, in which, for example, drive cables 15 depicted in FIG. 3, are guided. The drive cables 15 are also guided in corresponding recesses in lateral side parts 6 and 7, and are connected with the associated guide members 11.

In the assembled state of the side parts 6 and 7, and of front part 8, frame 4 defines a frame opening 16. On the outside of this frame opening 16, the guide tubes 14 extend along front part 8. Numeral 17 denotes a mounting plate to which a drive unit, not depicted in detail, can be secured, and which would comprise a drive unit serving to power drive cables 15 in guide tubes 14 and the guide elements of side parts 6 and 7, via a drive pinion.

As can be particularly seen from FIG. 2, the corner areas 13, continuing from front part 8, include water drains 18 which, preferably, are integrally molded to corner areas 13. End portions 19 of guide tubes 14, which can be injection molded into front part 8 at several spaced apart points, protrude at corner areas 13 and can be inserted into the corresponding guide channels 20 (see also FIG. 5) at side parts 6 and 7, so that there is a smooth transition, between the ends 19 of the guide tubes 14 and the guide channels 20 in side parts 6 and 7. The mounting plate 17 serves as a mount 21 for the drive unit 10, which is schematically depicted in FIG. 1. A gutter 22 is also disposed at front part 8.

A single cross member 9 is provided in approximately the lengthwise center of the longitudinally extending, lateral side parts 6 and 7. This cross member 9 may be formed of sheet metal or aluminum sheet, and serves to transversely stiffen frame 4.

At the rear ends of side parts 6 and 7, there are disposed water collector end pieces 24, which are made of synthetic plastic material, preferably formed by an injection molding process. These water collector end pieces 24 form the rear termination of the water conducting area of side parts 6 and 7.

Water drains 25 are formed at water collector end pieces 24. Furthermore, water collector end pieces 24 have fastening elements 26, for example, strap-like extensions, and the like, by means of which a firm connection with the fixed roof surface 2 can be established.

Figure 4:
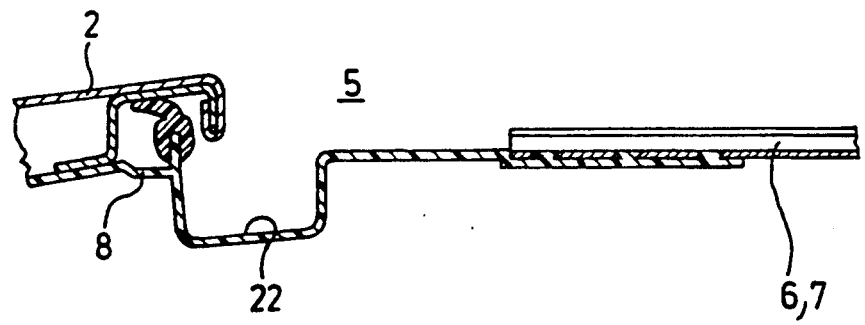
FIG. 4 is a sectional view taken along line IV—IV of FIG. 1.
Figure 5:
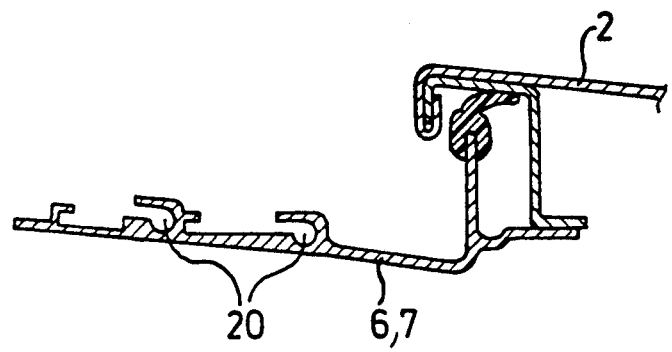
FIG. 5 is a sectional view taken along line V—V of FIG. 1.

When the individual parts, like side pieces 6 and 7, the front piece 8, and the cross member 9—as depicted in FIG. 1—have been assembled to form the frame, all of the connecting points are constituted by lap joints that may be joined by adhesive, or by being riveted. Cross member 9, preferably, is riveted, in a water proof manner, with side parts 6 and 7, for which purpose a continuous material flow connection (by mutual compression of overlapping pieces) can be provided. Front part 8, consisting of a synthetic injection molded part, preferably, is made of thermoplastic polyester, or of a glass mat reinforced thermoplastic material. FIG. 4 illustrates a connection in which a lap joint has been formed between front part 8 and side part 6,7 with portions of the front part having been extended through openings in the side parts 6,7 and the material then caused to flow (by riveting or other plastic deformation) into the wedge-like locking configuration shown. A layer of adhesive between these parts further serves to insure a waterproof connection is achieved.

The inventive design of frame 4 provides a kind of building block system for the assembly of frame 4, whose size can be variable, and which may be adapted to the respective vehicle type. That is, since the side parts 6 and 7 are extruded profile parts, they can be cut from stock material to the desired length. Furthermore, a flexible adaptation to the respective width desired can be obtained, as this dimension depends only, on the one hand, upon the length of cross member 9 and, on the other hand, upon that of front part 8, which can be selected from an inventory of standard sizes.

The total connection of the individual parts of frame 4 by the overlap joints and the plug connections is such that frame 4, as a whole, has the required distortion resistance and dimensional stability. Another benefit derived is that, inasmuch as the individual components of frame 4 can be made of relatively inexpensive and prefabricated materials, it results in a reduction in the cost of frame 4. The building block system, in particular, permits an extensive range of dimensional variations of frame 4, and the sliding roof or the sliding and lifting roof 3, while, simultaneously, ensuring a reliable parallel travel of guide members 11 during the movement of cover 12.

Another advantage of the inventive concept resides in the fact that frame 4 is relatively easy to install, since side parts 6 and 7 are loosely connected with the front part 8 via the plug connection of the protruding ends 19 of guide tubes 14. Subsequently, cross member 9 can be secured to side parts 6 and 7 for the purpose of transverse stiffening. The water collector end pieces 24, then, can be attached at the rear ends 23 of side parts 6 or 7 and are, likewise, preferably, made of a synthetic plastic material to reduce the total weight of frame 4, and furthermore, facilitate manufacture of the water conducting areas of frame 4, making them as corrosion resistant as possible.

Figure 6:
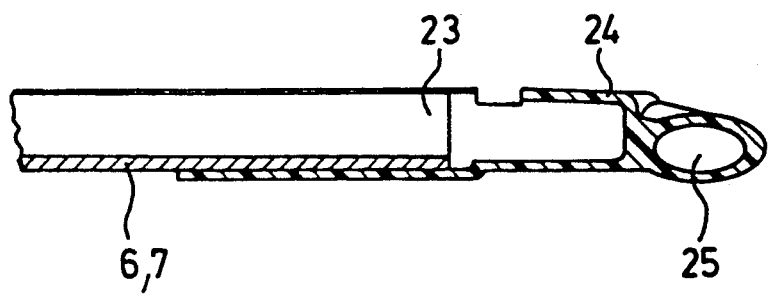
FIG. 6 is a sectional view taken along line VI—VI of FIG. 1.

FIGS. 3 and 6 further show details pertaining to the attachment of frame 4 at the fixed roof surface 2 of vehicle roof 1, as well as details regarding the profile structure of front part 8, of side parts 6 and 7, and of water collector end pieces 24.

It is to be understood that the invention is not limited to the above details describing the preferred embodiment of the invention, but that numerous changes and modifications could be apparent to those skilled in the art as being obtainable without departing from the inventive concept. For instance, the connection of the respective parts of frame 4, can also be by a combination of lap joint riveting and adhesive connection. Also, the individual parts of frame 4 can be made of appropriate materials other than those described, which are merely to be considered as a preferred material combination. Thus, the invention should be viewed as encompassing the full scope of the appended claims.

I claim:

1. A frame for a vehicle roof of the type having a roof opening in a fixed vehicle roof surface and a cover for closing the roof opening and means for displacing the cover to a position at least partially opening the roof opening by at least one of sliding and lifting motions, comprising two lateral side parts which are made of metal and extend in transversely spaced apart relationship to each other, parallel to a longitudinal axis of the vehicle; an injection molded synthetic plastic front part of which corner parts, serving as transition areas to the lateral side part are directly molded portions; and at least one cross member interconnecting said lateral side parts; wherein the lateral side parts have guide means for cover guide members which support the cover for displacement therealong and which cooperate with a drive unit at the front part via pressure-resistant drive cables; and wherein guide tubes for the pressure resistant drive cables are at least partially and immovably embedded into the molded material of the front part at least in the vicinity of said corner parts.

2. A frame according to claim 1, wherein the frame defines a frame opening for alignment with the roof opening, and the guide tubes extend outside of the frame opening at said front part.

3. A frame according to claim 2, wherein the guide tubes are molded into the front part only at a plurality of spaced apart locations in the vicinity of the corner parts.

4. A frame according to claim 2, wherein ends of the guide tubes protrude from the corner parts and are insertable into cable guides of the lateral side parts.

5. A frame according to claim 4, wherein a water drain is integrally formed into each corner part.

6. A frame according to claim 5, wherein the front part has a front water gutter.

7. A frame according to claim 1, wherein a mounting for the drive unit is formed by a molded-on portion of the front part.

8. A frame according to claim 1, wherein said at least one cross member is a single cross member that is arranged at a longitudinally central portion of the lateral side parts.

9. A frame according to claim 1, wherein water collector end pieces are provided at a rear end of each lateral side part for defining a water conducting area of the side parts.

10. A frame according to claim 9, wherein the water collector end pieces are made of synthetic plastic material.

11. A frame according to claim 9, wherein a water drain is formed in each water collector end piece.

12. A frame according to claim 9, wherein each water collector end piece has a mounting part for attachment to the fixed roof surface.

13. A frame according to claim 9, wherein the front piece is connected to the lateral side parts by lap joint connections, and each lateral side part is connected to a respective water collector end piece by a lap joint connection.

14. A frame according to claim 13, wherein the lap joint connections are secured by adhesive and are, additionally, riveted.

15. A frame according to claim 8, wherein the cross member is riveted to the lateral side parts in a waterproof manner.

16. A frame according to claim 15, wherein a continuous material flow connection is provided for waterproofing the riveted connection of the cross member to the lateral side parts.

17. A frame according to claim 1, wherein the lateral side parts are made of a light metal extrusion profile material.

18. A frame according to claim 17, wherein the light metal is aluminum.

19. A frame according to claim 17, wherein the cross member is a light metal sheet part.

20. A frame according to claim 1, wherein the front part is made of a glass mat reinforced thermoplastic polyester material.

* * * * *